J. K. DUKAS.
FISHING NET.
APPLICATION FILED APR. 4, 1919.
1,351,628.
Patented Aug. 31, 1920.
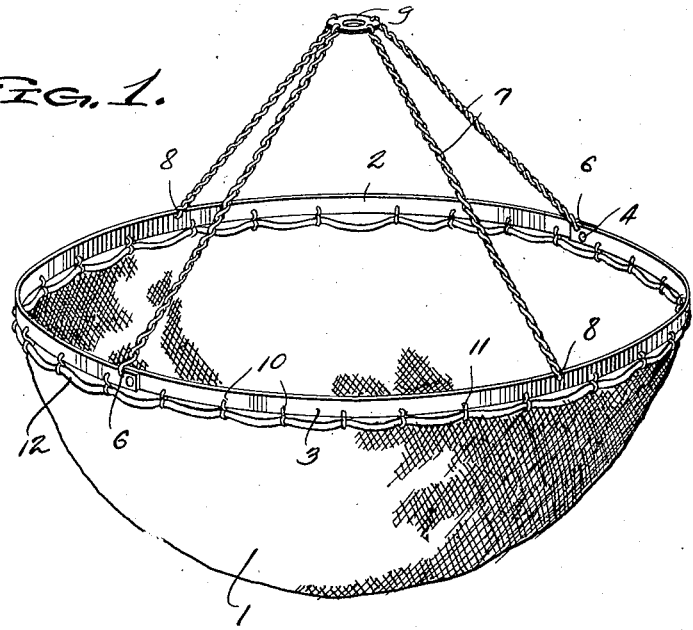
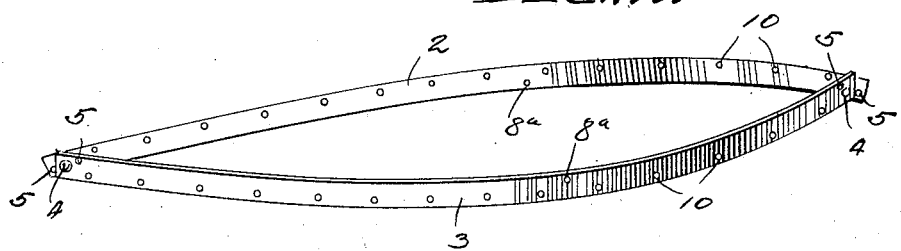
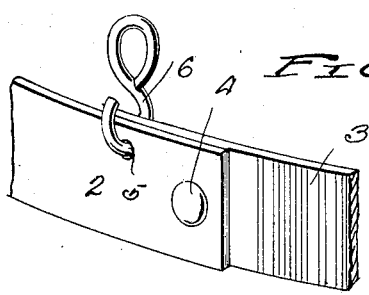
WITNESSES
INVENTOR.
James K. Dukas
BY
ATTORNEY.

UNITED STATES PATENT OFFICE.

JAMES K. DUKAS, OF EDWARDSVILLE, PENNSYLVANIA.

FISHING-NET.

1,351,628.  Specification of Letters Patent.  Patented Aug. 31, 1920.

Application filed April 4, 1919. Serial No. 287,442.

*To all whom it may concern:*

Be it known that I, JAMES K. DUKAS, a citizen of the United States, residing at Edwardsville, in the county of Luzerne and State of Pennsylvania, have invented certain new and useful Improvements in Fishing-Nets, of which the following is a specification.

This invention relates to fishing nets, and more particularly to dip nets.

The object of the invention is to provide a net of this character, the frame of which is collapsible to occupy a small space when not in use and which is held rigidly in open expanded position by the supporting means.

Another object is to provide a simple and efficient device of this character, which while cheap to manufacture is strong and durable.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a perspective view of a net constructed in accordance with this invention shown in open position ready for use, Fig. 2 is a similar view of the net supporting frame shown in partially collapsed position, Fig. 3 is an enlarged detail perspective view showing the connected ends of two of the frame sections held in rigid open position.

In the embodiment illustrated in Figs. 1 to 3, the net 1 which may be employed as a dip net or for suspending the small fish used for bait to retain them in good condition for use or it may be used for catching such fish. This net 1 is mounted on a collapsible frame composed of a plurality of sections, two being here shown, numbered 2 and 3. These sections 2 and 3 are composed of strap or band steel and may be of any desired length, according to the size of the net to be supported. These members 2 and 3 have their ends lapped and pivotally connected by pivots 4 to provide for their being folded into a small space as shown in Fig. 2 when the net is desired to be stored or shipped and when designed for use these sections are opened up and form a complete circle as is shown clearly in Fig. 1. Each member is provided at its pivot end with an aperture 5, those in the end of one member being arranged adjacent one side edge, and those of the other member adjacent the other side edge so that when the members are in open operative position, these apertures 5 will register, that is, the apertures in one member will register with those in the other member and they are designed to receive a pin, hook or other device which will hold the sections rigidly in expanded position.

As shown, the fastening elements are in the form of hook-like members 6 in the form of a figure eight, one bill being passed through the registering apertures 5 and the other connected with chains 7 which are designed to support the net. Four of these chains are shown, two being connected with the member 6 which holds the frame sections open and the other two carrying hooks 8 at one end which are engaged with apertures $8^a$ in the members 2 and 3, preferably at points midway the length thereof. These chains 7 are connected at their other ends by any suitable means, a ring 9 being here shown with which may be engaged any suitable support on which the net is to be mounted.

The strap members 2 and 3 are each provided with a plurality of longitudinally spaced apertures 10 arranged around their inner edges which are designed to receive connectors 11 which also engage the net 1 and unite it to the frame. These connectors 11 are here shown in the form of double hooks preferably constructed like a figure eight with their bills extending in opposite directions, similar to the connectors 6 shown in Fig. 3. One of the bills of the connectors 11 is engaged with the apertures 10 of the frame sections and the other with the upper edge of the net 1 which is reinforced as shown at 12, a binding being preferably used for this purpose so as to insure the necessary strength for supporting the contents of the net.

In the use of this net, it having first been attached to the frame by the connectors 11, the frame sections are turned on their pivots 4 from the position shown in Fig. 2 to that shown in Fig. 1 with their connected ends lapping to cause the apertures 5 therein to register to receive the hooks 6 carried by the chains 7. When these hooks are so engaged, the frame will be held rigidly in open position, the chains 7 which are connected with the sections 2 and 3 midway their ends being permanently carried by said sections so that there is no danger of their being lost, it being obvious that the connectors 6 are detached when the frame is to be collapsed.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

A device of the class described comprising a collapsible frame composed of jointed sections, a net carried thereby, supporting chains, one of which is permanently engaged with said frame, and the others having hooks detachably engaged therewith at their joints to hold the frame in expanded position.

In testimony whereof I affix my signature in presence of two witnesses.

JAMES K. DUKAS.

Witnesses:
JAMES WILLIAMS,
RICHARD DOUGHTON.